United States Patent
Li et al.

(10) Patent No.: US 11,002,661 B2
(45) Date of Patent: May 11, 2021

(54) APPARATUS AND METHOD FOR IDENTIFYING METAL CORROSION

(71) Applicant: SHENZHEN UNIVERSITY, Guangdong (CN)

(72) Inventors: Dawang Li, Guangdong (CN); Feng Xing, Guangdong (CN); Jiazhao Liu, Guangdong (CN); Longyuan Li, Guangdong (CN)

(73) Assignee: SHENZHEN UNIVERSITY, Guangdong (CN)

(*) Notice: Subject to any disclaimer, the term of this patent is extended or adjusted under 35 U.S.C. 154(b) by 291 days.

(21) Appl. No.: 16/322,097

(22) PCT Filed: Feb. 2, 2018

(86) PCT No.: PCT/CN2018/075033
§ 371 (c)(1),
(2) Date: Jan. 30, 2019

(87) PCT Pub. No.: WO2019/127839
PCT Pub. Date: Jul. 4, 2019

(65) Prior Publication Data
US 2019/0226978 A1   Jul. 25, 2019

(30) Foreign Application Priority Data

Dec. 28, 2017 (CN) .......................... 201711459601.9

(51) Int. Cl.
*G01N 17/04* (2006.01)
*G01N 17/00* (2006.01)

(52) U.S. Cl.
CPC ......... *G01N 17/006* (2013.01); *G01N 17/046* (2013.01)

(58) Field of Classification Search
CPC .................................................... G01N 17/006
(Continued)

(56) References Cited

U.S. PATENT DOCUMENTS 2,910,863 A * 11/1959 Hornbostel .............. D21F 1/10
  73/86
5,945,594 A *  8/1999 Kendig .................... G01N 3/32
  204/404

FOREIGN PATENT DOCUMENTS

CN   103105354 A   5/2013
CN   103983559 A   8/2014
(Continued)

OTHER PUBLICATIONS

International Search Report in PCT/CN2018/075033, dated Oct. 8, 2018, 5pp.

*Primary Examiner* — Walter L Lindsay, Jr.
*Assistant Examiner* — Philipmarcus T Fadul
(74) *Attorney, Agent, or Firm* — Hauptman Ham, LLP

(57) ABSTRACT

An apparatus for identifying metal corrosion includes a metal test piece, a push button timer, a liquid tank, a support, two fixed pulleys, a traction cable, a weight and a vibration motor. The support and the first pulley are in a lower portion of the tank. The second pulley is above the first pulley. The test piece is fixed on the support and connected to a first end of the traction cable which sequentially winds around the pulleys with a second end outside the tank. The weight, on which the motor is fixed, is suspended at the second end. The timer is under the motor. A corrosion solution is added into the tank, and the vibration motor provides alternating stress. When the metal test piece is broken, the weight and the motor are dropped and pressed on the electronic timer to record breaking time of the metal test piece.

10 Claims, 1 Drawing Sheet

(58) Field of Classification Search
USPC .............................................................. 73/86
See application file for complete search history.

(56) References Cited

FOREIGN PATENT DOCUMENTS

| | | | |
|---|---|---|---|
| CN | 105424526 | A | 3/2016 |
| CN | 205301142 | U | 6/2016 |
| CN | 105758786 | A | 7/2016 |
| CN | 106053323 | A | 10/2016 |
| CN | 106066300 | A | 11/2016 |
| CN | 207717596 | U | 8/2018 |
| SU | 1054747 | A1 | 11/1983 |

* cited by examiner

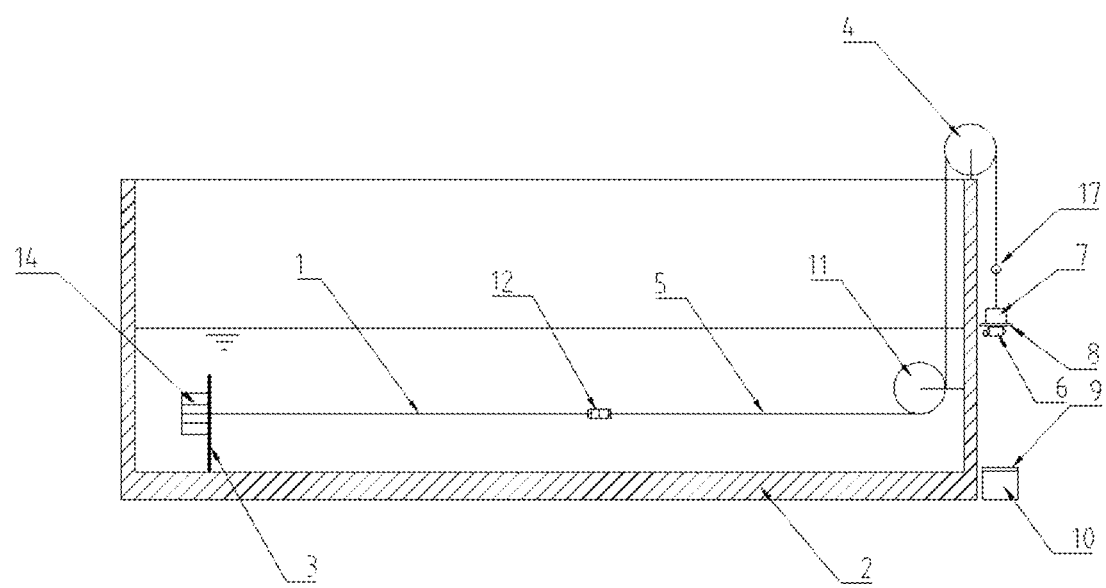

APPARATUS AND METHOD FOR IDENTIFYING METAL CORROSION

RELATED APPLICATIONS

The present application is a National Phase of International Application Number PCT/CN2018/075033, filed Feb. 2, 2018, which claims priority to CN 201711459601.9, filed Dec. 28, 2017.

FIELD OF THE INVENTION

The invention relates to a metal stress corrosion test, in particular to an apparatus and a method for identifying metal corrosion under alternating stress, and belongs to the technical field of corrosion testing.

BACKGROUND OF THE INVENTION

Other construction structures, such as bridge structures, exposed to the atmosphere and the marine environment, are susceptible to metal corrosion by chloride ions and other corrosive media. The actual bridge structure is subjected to constant loads, dynamic loads and alternating loads due to wind pressure, snow pressure, and vehicle driving, thus the cracking of metal properties can be seriously exacerbated. Efficient simulation of the load state of the engineering structure for investigating stress corrosion under various operating conditions is a critical technical issue for service reliability analysis and life assessment of a metal structure.

An invention patent application No. CN 201410151891.0 discloses a prompting device and a prompting method for rusting and chloride ion concentration limit state of a steel bar. The prompting device for rusting and chloride ion concentration limit state of a steel bar includes a rust test piece, a bow frame and a tension adjuster for test piece, wherein the rust test piece is a steel string; the steel string is tightened by the bow frame, and one end of the steel string is fixed at one end of the bow frame, the other end of the steel string is fixed to the other end of the bow frame by the tension adjuster for test piece. The above-mentioned prompting device is placed in a corrosive environment, when the steel string is broken and the bow frame is opened, the steel bar is prompted to rust and reaches the limit state of the chloride ion concentration. Firstly, the identification device takes only a single static load effect into consideration, and does not consider the prompting device and method under the action of the dynamic load; secondly, the bow will undergo creep deformation under the continuous load so that the actual stress of the metal wire is different from the stress initially measured, and the force changes more with the extension of the test duration; thirdly, for the metal material with good ductility, the bow device would have reduced force applied to the bow frame due to the tensile elongation of the metal wire.

SUMMARY OF THE INVENTION

Therefore, in view of the above-mentioned deficiencies in the prior art, the invention provides an apparatus and a method for identifying metal corrosion under structurally simple, various force operating conditions, particularly under alternating stress, to solve the problems such as metal corrosion identification, tension determination and corrosion rate calculation under alternating tension conditions.

In order to achieve the above invention, the invention provides the technical solution as follows:

Provided is an apparatus for identifying metal corrosion, comprising: a metal test piece, a timer, a tensioning device and a liquid tank, the tensioning device further comprising a support, a first fixed pulley, a second fixed pulley, a traction cable, a weight and a vibration motor; wherein the support is fixed within a lower portion of the liquid tank on one side thereof, the first fixed pulley is fixed within the lower portion of the liquid tank on the other side thereof, and the second fixed pulley is fixed on the upper end of a side wall of the liquid tank on the side of the first fixed pulley; the metal test piece is fixed on the support at one end thereof, and connected to a first end of the traction cable at the other end thereof; the traction cable sequentially winds around the first fixed pulley and the second fixed pulley, a second end of the traction cable is located outside the liquid tank and the weight, on which the vibration motor is fixed, is suspended at the second end of the traction cable; and the timer is a push button type electronic timer that is disposed directly under the vibration motor.

Further, the weight comprises a load and a load hanger, the load hanger is suspended at the second end of the traction cable, and the vibration motor is attached to the bottom surface of the load hanger.

Further, a ring is provided on the second end of the traction cable, and the load and the load hanger are suspended on the ring.

Further, the metal test piece is fixed, at one end thereof, to the support by a non-metallic fastening bolt, and is connected to the first end of the traction cable by a light-weight non-metallic double-headed screw bolt at the other end thereof.

Further, the metal test piece is a metal wire.

Further, the push button type electronic timer is further provided with a shockproof sponge at the top surface thereof.

Further, the support, the first fixed pulley, the second fixed pulley, and the liquid tank are non-metallic components.

Further, the traction cable is made of high-strength fiber.

Further, a plurality of sets of parallel tensioning devices are arranged in the liquid tank, and in the plurality of sets of parallel tensioning devices, the metal test piece with any physical property can be disposed to perform identification of various metal corrosions and corrosion rates.

Provided an identification method using the apparatus for identifying metal corrosion described above, comprising the steps of:

step 1: setting the liquid tank, setting the support and the first fixed pulley in the liquid tank, and fixing the second fixed pulley to the upper end of the side wall of the liquid tank on the side of the first fixed pulley;

step 2: fixing one end of the metal test piece on the support, connecting the other end thereof with the first end of the traction cable; winding the traction cable around the first fixed pulley and the second fixed pulley sequentially, disposing, outside the liquid tank, the second end of the traction cable on which the weight is suspended, and attaching the vibration motor on the weight;

step 3: setting the vibration frequency of the vibration motor such that the vibration motor and the weight together generate a low-frequency alternating tension; wherein, the vibration frequency θ of the vibration motor is changed by suspending the weight having a weight of ΔG and the vibration motor having a weight of $G_1$ under the ring arranged on the second end of the traction cable;

step 4: injecting the corrosion solution to be studied into the liquid tank to carry out the corrosion test; simultaneously, returning the button type electronic timer arranged vertically below the weight to zero as the test starting point;

step 5: visually inspecting the occurrence of initial rust spots of the metal test piece in the corrosion solution, and recording the time displayed on the button type electronic timer as $t_s$;

step 6: leaving the metal test piece to corrode continuously, and once the metal test piece is broken by corrosion, recording the breaking time $t_r$ in such a manner that the weight and the vibration motor suspended at the lower end of the ring fall perpendicularly to the button of the button type electronic timer; wherein the button type electronic timer is provided with the shockproof sponge at the top surface thereof;

when the metal test piece is broken by corrosion, $$A_1 = \frac{F}{[\sigma]} \tag{1}$$

where $[\sigma]$ is tensile strength of the metal test piece, $$F = \beta \cdot G \tag{2}$$

is the maximum value of the alternating tension with a vibration frequency of $\theta$, where $$G = G_1 + \Delta G \tag{3}$$

and is the sum of the weight $G_1$ of the vibration motor and the weight $\Delta G$ of the weight; wherein the vibration motor is attached to the bottom surface of the load hanger, and the total weight can be changed by increasing or decreasing the weight $\Delta G$ on the load hanger, and $$\beta = \frac{1}{1 - \theta^2/\omega^2} \tag{4}$$

is a dynamic coefficient, where $\omega$ is a natural frequency of a single-degree-of-freedom system composed of the metal test piece, the traction cable and the weight G, since the metal test piece and the traction cable are in a series structure in the apparatus for identifying, as actually measured or structural mechanics theory calculated, which can be calculated as follows:

$$k_1 = \sqrt{\frac{E_1 A_1}{l_1}} \tag{5}$$

$$k_2 = \sqrt{\frac{E_2 A_2}{l_2}} \tag{6}$$

$$k = \frac{1}{k_1} + \frac{1}{k_2} = \frac{k_1 k_2}{k_1 + k_2} \tag{7}$$

$$\omega = \sqrt{\frac{k}{m}} = \sqrt{\frac{kg}{G}} \tag{8}$$

where, $E_1$ and $E_2$ are Young's modulus of the metal test piece and the traction cable respectively, $A_1$ and $A_2$ are cross-sectional areas of the metal test piece and the traction cable respectively, $l_1$ and $l_2$ are horizontal lengths of the metal test piece and the traction cable respectively, and g=9.80665 m/s² and is acceleration of gravity.

The corrosion rate V of the metal test piece is obtained by the following equation:

$$V = \frac{A_0 - A_1}{t_r - t_s} \tag{9}$$

where $A_0$ is cross-sectional area of the metal test piece, $A_1$ is cross-sectional area at the time of breaking of the metal test piece, and $t_s$ is occurrence time of the initial rust spot in the metal test piece, and $t_r$ is breaking time of the metal test piece;

step 7: performing various operating condition tests simultaneously with the plurality of sets of parallel tensioning devices in the liquid tank according to the steps above.

Compared with the prior art, the invention has the following technical effects:

The invention has simple configuration in that the alternating stress is applied to the metal test piece placed in the liquid tank by the vibration motor fixed on the weight, and the quantitative weight and the vibration motor can accurately control the alternating stress of the metal test piece, and can be identified. Corrosion of metallic materials under alternating stress and corrosion rate of metallic materials under alternating stress and corrosion rate of metallic materials under alternating stress. In particular, compared with the identification device that is a bow device in the Application No. CN 201410151891.0, the device firstly expands from static force to alternating tensile force, allowing application in wider range of metal force operating conditions and studying more corrosion operating conditions; secondly, the tensile force is controllable, that is, the weight and vibration motor are applied so as to determine accurately the tensile force of the metal; thirdly, the apparatus is capable of clearly identifying the metal rusting according to the weight and the motor state, and ingeniously recording the breaking time in metal corrosion test, thereby identifying the corrosion rate of the metal; fourthly, in the plurality of sets of parallel apparatuses, metal materials with various physical properties, including any mechanical properties, any cross-section dimensions and the like, can be arranged efficiently and easily without interference between tests.

BRIEF DESCRIPTION OF THE DRAWINGS

FIG. 1 is a schematic structural view of an apparatus for identifying metal corrosion according to the invention.

DETAILED DESCRIPTION OF THE PREFERRED EMBODIMENTS

The present invention will be further described in detail below with reference to FIG. 1 and specific embodiments.

An apparatus for identifying metal corrosion includes a metal test piece 1, a timer 10, a tensioning device and a liquid tank 2, and the metal test piece 1 is a metal wire. The tensioning device further includes a support 3, a first fixed pulley 11, a second fixed pulley 4, a traction cable 5, a weight and a vibration motor 6. The support 3 is fixed within a lower portion of the liquid tank 2 on one side thereof, the first fixed pulley 11 is fixed within the lower portion of the liquid tank 2 on the other side thereof, and the second fixed pulley 4 is fixed on the upper end of a side wall of the liquid tank 2 on the side of the first fixed pulley 11. The metal test piece 1 is fixed on the support 3 at one end thereof by means of a non-metallic fastening bolt 14, and connected to a first end of the traction cable 5 at the other end thereof by means of a lightweight non-metallic double-headed screw bolt 12. The traction cable 5 sequentially winds around the first fixed pulley 11 and the second fixed pulley 4, a second end of the traction cable 5 is located outside the liquid tank 2 and the weight, on which the vibration motor 6 is fixed, is suspended at the second end of the traction cable 5. The vibration motor 6 can be set to any vibration frequency. The weight comprises a load 7 and a load hanger 8, the load hanger 8 is suspended at the second end of the traction cable 5, and the vibration motor 6 is attached to the bottom surface of the load hanger 8. A ring 17 is provided on the second end of the traction cable 5, and the load 7 and the load hanger 8 are suspended. The timer 10 is a push button type electronic timer that is disposed directly under the vibration motor 6. The push button type electronic timer is further provided with a shockproof sponge 9 at the top surface thereof.

In the apparatus, the support 3, the first fixed pulley 11, the second fixed pulley 4 and the liquid tank 2 are all made of a non-metallic member, and the first fixed pulley 11 and the second fixed pulley 4 have a small diameter and a smooth surface, and therefore reduced friction due to contact with the traction cable 5. The traction cable 5 is made of a high-strength fiber. In addition, a plurality of parallel tensioning devices can be arranged in the liquid tank 2, and the metal test piece 1 with any physical properties, including any mechanical properties, any cross-section dimensions and the like, can be disposed in the plurality of sets of parallel tensioning devices to perform identification of various metal corrosions.

An identification method using the apparatus for identifying metal corrosion described above includes the steps of:

step 1: arranging the liquid tank 2, arranging the support 3 and the first fixed pulley 11 in the liquid tank 2, and fixing the second fixed pulley 4 to the upper end of the side wall of the liquid tank on the side of the first fixed pulley 11;

step 2: fixing one end of the metal test piece 1 on the support 3, connecting the other end thereof with the first end of the traction cable 5; winding the traction cable 5 around the first fixed pulley 11 and the second fixed pulley 4 sequentially, disposing, outside the liquid tank 2, the second end of the traction cable 5 on which the weight is suspended, and attaching the vibration motor 6 on the weight;

step 3: setting the vibration frequency of the vibration motor 6 such that the vibration motor 6 and the weight together generate a low-frequency alternating tension; wherein, the vibration frequency θ of the vibration motor 6 is changed by suspending the weight having a weight of ΔG and the vibration motor 6 having a weight of G1 under the ring 17 arranged on the second end of the traction cable 5;

step 4: injecting the corrosion solution to be studied into the liquid tank 3 to carry out the corrosion test; simultaneously, returning the button type electronic timer arranged vertically below the weight to zero as the test starting point;

step 5: visually inspecting the occurrence of initial rust spots of the metal test piece (1) in the corrosion solution, and recording the time displayed on the button type electronic timer as $t_s$;

step 6: leaving the metal test piece 1 to corrode continuously, and once the metal test piece 1 is broken by corrosion, recording the breaking time $t_r$ in such a manner that the weight and the vibration motor 6 suspended at the lower end of the ring 17 fall perpendicularly to the button of the button type electronic timer; wherein the button type electronic timer is provided with the shockproof sponge 9 at the top surface thereof;

when the metal test piece 1 is broken by corrosion, $$A_1 = \frac{F}{[\sigma]} \quad (1)$$

where [σ] is tensile strength of the metal test piece, $$F = \beta \cdot G \quad (2)$$

is the maximum value of the alternating tension with a vibration frequency of θ, where $$G = G_1 + \Delta G \quad (3)$$

and is the sum of the weight $G_1$ of the vibration motor 6 and the weight ΔG of the weight; wherein the vibration motor 6 is attached to the bottom surface of the load hanger 8, and the total weight can be changed by increasing or decreasing the weight ΔG on the load hanger 8, and $$\beta = \frac{1}{1 - \theta^2/\omega^2} \quad (4)$$

is a dynamic coefficient, where ω is a natural frequency of a single-degree-of-freedom system composed of the metal test piece 1, the traction cable 5 and the weight G, since the metal test piece 1 and the traction cable 5 are in a series structure in the apparatus for identifying, as actually measured or structural mechanics theory calculated, which can be calculated as follows:

$$k_1 = \sqrt{\frac{E_1 A_1}{l_1}} \quad (5)$$

$$k_2 = \sqrt{\frac{E_2 A_2}{l_2}} \quad (6)$$

$$k = \frac{1}{k_1} + \frac{1}{k_2} = \frac{k_1 k_2}{k_1 + k_2} \quad (7)$$

$$\omega = \sqrt{\frac{k}{m}} = \sqrt{\frac{kg}{G}} \quad (8)$$

where, $E_1$ and $E_2$ are Young's modulus of the metal test piece 1 and the traction cable 5 respectively, $A_1$ and $A_2$ are cross-sectional areas of the metal test piece 1 and the traction cable 5 respectively, $l_1$ and $l_2$ are horizontal lengths of the metal test piece 1 and the traction cable 5 respectively, and g=9.80665 m/s² and is acceleration of gravity.

The corrosion rate V of the metal test piece 1 is obtained by the following equation:

$$V = \frac{A_0 - A_1}{t_r - t_s} \quad (9)$$

where $A_0$ is cross-sectional area of the metal test piece, $A_1$ is cross-sectional area at the time of breaking of the metal test piece, and $t_s$ is occurrence time of the initial rust spot in the metal test piece, and $t_r$ is breaking time of the metal test piece;

step 7: performing various operating condition tests simultaneously with the plurality of sets of parallel tensioning devices in the liquid tank 2 according to the steps above.

The above embodiment of the invention demonstrates that the apparatus for identifying metal corrosion according to the invention has simple configuration and operation, and high test efficiency, and can be used to identify the metal corrosion under the action of alternating stress and the corrosion rate of the metal under the alternating stress. The above apparatus can also be used for studying the issue on passivation effect under alternating stress.

The above-mentioned embodiment is only for the purpose of illustrating the technical solutions of the invention, and is not intended to limit the present invention. The modification made by those skilled in the art based on common knowledge in the art, are also incorporated in the scope of the application. In the meantime, the above-described embodiment is merely illustrative, and the scope of the application is defined by the scope of the appended claims.

What is claimed is:

1. An apparatus for identifying metal corrosion, comprising: a metal test piece (1), a timer (10), a tensioning device and a liquid tank (2), the tensioning device further comprising a support (3), a first fixed pulley (11), a second fixed pulley (4), a traction cable (5), a weight and a vibration motor (6); wherein the support (3) is fixed within a lower portion of the liquid tank (2) on one side thereof, the first fixed pulley (11) is fixed within the lower portion of the liquid tank (2) on the other side thereof, and the second fixed pulley (4) is fixed on the upper end of a side wall of the liquid tank (2) on the side of the first fixed pulley (11); the metal test piece (1) is fixed on the support (3) at one end thereof, and connected to a first end of the traction cable (5) at the other end thereof; the traction cable (5) sequentially winds around the first fixed pulley (11) and the second fixed pulley (4), a second end of the traction cable (5) is located outside the liquid tank (2) and the weight, on which the vibration motor (6) is fixed, is suspended at the second end of the traction cable (5); and the timer (10) is a push button type electronic timer that is disposed directly under the vibration motor (6).

2. The apparatus for identifying metal corrosion according to claim 1, wherein the weight comprises a load (7) and a load hanger (8), the load hanger (8) is suspended at the second end of the traction cable (5), and the vibration motor (6) is attached to the bottom surface of the load hanger (8).

3. The apparatus for identifying metal corrosion according to claim 2, wherein a ring (17) is provided on the second end of the traction cable (5), and the load (7) and the load hanger (8) are suspended on the ring (17).

4. The apparatus for identifying metal corrosion according to claim 3, wherein the metal test piece (1) is fixed, at one end thereof, to the support (3) by a non-metallic fastening bolt (14), and is connected to the first end of the traction cable (5) by a lightweight non-metallic double-headed screw bolt (12) at the other end thereof.

5. The apparatus for identifying metal corrosion according to claim 4, wherein the metal test piece (1) is a metal wire.

6. The apparatus for identifying metal corrosion according to claim 5, wherein the push button type electronic timer is further provided with a shockproof sponge (9) at the top surface thereof.

7. The apparatus for identifying metal corrosion according to claim 6, wherein the support (3), the first fixed pulley (11), the second fixed pulley (4), and the liquid tank (2) are non-metallic components.

8. The apparatus for identifying metal corrosion according to claim 7, wherein the traction cable (5) is made of high-strength fiber.

9. The apparatus for identifying metal corrosion according to claim 8, wherein a plurality of parallel tensioning devices are arranged in the liquid tank (2), and in the plurality of sets of parallel tensioning devices, the metal test piece (1) with any physical property is disposed to perform identification of various metal corrosions and corrosion rates.

10. An identification method using the apparatus for identifying metal corrosion according to claim 9, comprising the steps of:

step 1: arranging the liquid tank (2), arranging the support (3) and the first fixed pulley (11) in the liquid tank (2), and fixing the second fixed pulley (4) to the upper end of the side wall of the liquid tank on the side of the first fixed pulley (11);

step 2: fixing one end of the metal test piece (1) on the support (3), connecting the other end thereof with the first end of the traction cable (5); winding the traction cable (5) around the first fixed pulley (11) and the second fixed pulley (4) sequentially, disposing, outside the liquid tank (2), the second end of the traction cable (5) on which the weight is suspended, and attaching the vibration motor (6) on the weight;

step 3: setting the vibration frequency of the vibration motor (6) such that the vibration motor (6) and the weight together generate a low-frequency alternating tension; wherein, the vibration frequency θ of the vibration motor (6) is changed by suspending the weight having a weight of ΔG and the vibration motor (6) having a weight of $G_1$ under the ring (17) arranged on the second end of the traction cable (5);

step 4: injecting the corrosion solution to be studied into the liquid tank (3) to carry out the corrosion test; simultaneously, returning the button type electronic timer arranged vertically below the weight to zero as the test starting point;

step 5: visually inspecting the occurrence of initial rust spots of the metal test piece (1) in the corrosion solution, and recording the time displayed on the button type electronic timer as $t_s$;

step 6: leaving the metal test piece (1) to corrode continuously, and once the metal test piece (1) is broken by corrosion, recording the breaking time $t_r$ in such a manner that the weight and the vibration motor (6) suspended at the lower end of the ring (17) fall perpendicularly to the button of the button type electronic timer; wherein the button type electronic timer is provided with the shockproof sponge (9) at the top surface thereof;

when the metal test piece (1) is broken by corrosion, $$A_1 = \frac{F}{[\sigma]} \qquad (1)$$

where [σ] is tensile strength of the metal test piece, $$F = \beta \cdot G \qquad (2)$$

is the maximum value of the alternating tension with a vibration frequency of θ, where $$G = G_1 + \Delta G \qquad (3)$$

and is the sum of the weight $G_1$ of the vibration motor (6) and the weight ΔG of the weight; wherein the vibration motor (6) is attached to the bottom surface of the load hanger (8), and the total weight can be changed by increasing or decreasing the weight ΔG on the load hanger 8, and $$\beta = \frac{1}{1-\theta^2/\omega^2} \quad (4)$$

is a dynamic coefficient, where ω is a natural frequency of a single-degree-of-freedom system composed of the metal test piece (1), the traction cable (5) and the weight G, since the metal test piece (1) and the traction cable (5) are in a series structure in the apparatus for identifying, as actually measured or structural mechanics theory calculated, which can be calculated as follows:

$$k_1 = \sqrt{\frac{E_1 A_1}{l_1}} \quad (5)$$

$$k_2 = \sqrt{\frac{E_2 A_2}{l_2}} \quad (6)$$

$$k = \frac{1}{k_1} + \frac{1}{k_2} = \frac{k_1 k_2}{k_1 + k_2} \quad (7)$$

$$\omega = \sqrt{\frac{k}{m}} = \sqrt{\frac{kg}{G}} \quad (8)$$

where, $E_1$ and $E_2$ are Young's modulus of the metal test piece (1) and the traction cable (5) respectively, $A_1$ and $A_2$ are cross-sectional areas of the metal test piece (1) and the traction cable (5) respectively, $l_1$ and $l_2$ are horizontal lengths of the metal test piece (1) and the traction cable (5) respectively, and g=9.80665 m/s² and is acceleration of gravity;

wherein, the corrosion rate V of the metal test piece (1) is obtained by the following equation:

$$V = \frac{A_0 - A_1}{t_r - t_s} \quad (9)$$

where $A_0$ is cross-sectional area of the metal test piece, $A_1$ is cross-sectional area at the time of breaking of the metal test piece, and $t_s$ is occurrence time of the initial rust spot in the metal test piece, and $t_r$ is breaking time of the metal test piece;

step 7: performing various operating condition tests simultaneously with the plurality of sets of parallel tensioning devices in the liquid tank (2) according to the steps above.

\* \* \* \* \*